(12) United States Patent
Sørensen et al.

(10) Patent No.: US 9,080,906 B2
(45) Date of Patent: Jul. 14, 2015

(54) ULTRASONIC FLOW METER WITH ZERO IMPEDANCE MEASURING ELECTRONICS

(75) Inventors: Jens Lykke Sørensen, Beder (DK); Janus Honoré, Hovedgård (DK)

(73) Assignee: Kamstrup A/S, Skanderborg (DK)

( * ) Notice: Subject to any disclaimer, the term of this patent is extended or adjusted under 35 U.S.C. 154(b) by 60 days.

(21) Appl. No.: 13/880,932

(22) PCT Filed: Oct. 14, 2011

(86) PCT No.: PCT/DK2011/050386
§ 371 (c)(1),
(2), (4) Date: Apr. 22, 2013

(87) PCT Pub. No.: WO2012/055413
PCT Pub. Date: May 3, 2012

(65) Prior Publication Data
US 2013/0205913 A1      Aug. 15, 2013

(30) Foreign Application Priority Data

Oct. 27, 2010    (EP) ..................................... 10189024

(51) Int. Cl.
*G01F 1/66*      (2006.01)
(52) U.S. Cl.
CPC ....................................... *G01F 1/667* (2013.01)
(58) Field of Classification Search
CPC ....................................................... G01F 1/667

USPC .............................. 73/861.27, 861.28, 861.29
See application file for complete search history.

(56) References Cited

U.S. PATENT DOCUMENTS 2,724,269 A * 11/1955 Kalmus ........................ 73/861.28
5,105,666 A *  4/1992 Steinacher ................. 73/861.28

FOREIGN PATENT DOCUMENTS

| DE | 19810798 A1 | * | 9/1998 | ............... G01F 1/66 |
| DE | 10048959 A1 | * | 5/2001 | ............... G01F 1/66 |
| EP | 0 846 936 A1 | | 6/1998 | |
| EP | 1 361 417 A2 | | 11/2003 | |
| EP | 2 383 550 | | 11/2011 | |
| FR | 1355584 A | * | 3/1964 | ............... G01F 1/66 |
| GB | 2 423 363 | | 8/2006 | |
| WO | WO 95/04258 | | 2/1995 | |
| WO | WO 2011134470 A2 | * | 11/2011 | ............... G01F 1/66 |

* cited by examiner

*Primary Examiner* — Harshad R Patel
(74) *Attorney, Agent, or Firm* — Knobbe Martens Olson & Bear LLP

(57) ABSTRACT

The present invention discloses an ultrasonic flow meter comprising a generator circuit and a receiver circuit electrically separated from the generator circuit. The flow meter further comprises transducer switching means for controlled connection of ultrasonic transducers to either the generator circuit or to the receiver circuit. The output impedance of the generator circuit and the input impedance of the receiver circuit are controlled to be substantially zero.

7 Claims, 3 Drawing Sheets

ULTRASONIC FLOW METER WITH ZERO IMPEDANCE MEASURING ELECTRONICS

CROSS REFERENCE TO RELATED APPLICATIONS

This application is a U.S. National Phase Application of PCT International Application Number PCT/DK2011/050386, filed on Oct. 14, 2011, designating the United States of America and published in the English language, which is an International Application of and claims the benefit of priority to European Patent Application No. 10189024.2, filed on Oct. 27, 2010. The disclosures of the above-referenced applications are hereby expressly incorporated by reference in their entireties.

FIELD OF THE INVENTION

The present invention relates to an ultrasonic flow meter and to a method of operating an ultrasonic flow meter.

BACKGROUND OF THE INVENTION

In a consumption ultrasonic flow meter of the transit time type, the determination of the consumption is based on a flow rate measurement of the consumed medium. The flow rate measurement is based on measuring a transit time difference between counter-propagating ultrasonic waves in the medium flow. The ultrasonic waves are generated by piezo-electric ultrasonic transducers. The typical transit times of the ultrasonic signals through the medium are very short, and therefore the transit times, or at least the time differences, need to be measured with a very high accuracy. One important factor in relation to the accuracy of the measurement is the impedance of the electronic arrangement as seen by the transducers when they act as transmitter and as receiver of ultrasonic signals. Any difference in the impedances in these two situations will translate into a measurement uncertainty.

EP 0 846 936 discloses an ultrasonic flow meter. It discloses that the electronic arrangement for controlling the ultrasonic transducers comprises a separate generator circuit and a separate receiver circuit that are connected to each other by a direct electrical connection, where the ultrasonic transducers are connected to this direct connection via switches. In this setup, each transducer sees the same low output impedance of the generator circuit and the same high input impedance of the receiver circuit, irrespectively of whether it works as a transmitter or as a receiver.

DE 100 48 959 C2 discloses an ultrasonic flow meter with an electronic arrangement for controlling the ultrasonic transducers where the generator circuit and the receiver circuit are combined in a single circuit, and each transducer sees the same impedance as defined by an input/output resistor irrespectively of whether it works as a transmitter or as a receiver.

FR 1.355.584 discloses an ultrasonic flow meter with an electronic arrangement for controlling the ultrasonic transducers, where the electronic arrangement ensures that the impedances in front of the transducers are extremely small both in transmission and reception modes, and each transducer consequently sees a very small impedance irrespectively of whether or not it works as transmitter or receiver, and thereby any differences between the impedances are also very small.

In these systems, switches are shifted between the transmitting and receiving transducers while the ultrasonic signal propagates through the medium. While the switching itself may be practically instantaneous, any electronic transients arising from the switching need to die out before an accurate measurement can be made. Consequently a certain distance must be covered by the ultrasonic wave inside the flow meter, hindering among other things, the fabrication of small flow meters.

WO 94/17371 discloses an ultrasonic flow meter with an electronic arrangement, where switches are applied in a manner so that there is not a need for switching while the ultrasonic signal propagates through the medium, and consequently the length of the flow tube is not limited by the time it takes switch related electronic transients to die out. However, in the disclosure of WO 94/17371, the electronic arrangement requires that each flow meter circuit needs to be impedance matched for so-called reciprocal operation. This is a time consuming and expensive operation to perform on each flow meter circuit.

SUMMARY OF THE INVENTION

It would be advantageous to achieve an ultrasonic flow meter which is not restricted by a minimal travel time of the ultrasonic signal, which is nevertheless capable of measuring the travel time with a high precision without individual adjustment of the electronic circuit. Moreover, it would be advantageous to achieve an ultrasonic flow meter which is less sensitive to the electro-mechanical characteristics of the transducers. In general, the invention preferably seeks to mitigate, alleviate or eliminate one or more disadvantages of flow meters of the prior art, singly or in any combination.

In a first aspect of the invention, there is provided an ultrasonic flow meter comprising:
  at least two ultrasonic transducers arranged for transmission and receipt of ultrasonic signals in opposite directions across a measuring distance, the at least two ultrasonic transducers comprises at least a first transducer positioned at one end of the measuring distance and at least a second ultrasonic transducer positioned at the other end of the measuring distance;
  transducer switching means electrically connected to the at least two ultrasonic transducers;
  a generator circuit for controlled generation of electrical signals for transmission to the at least two ultrasonic transducers, the generator circuit comprises or is connected to a signal source;
  a receiver circuit for receiving electrical signals from the at least two ultrasonic transducers, the receiver circuit being separate from the generator circuit, the receiver circuit further comprises a receiver output for connection to a detection means;
wherein the transducer switching means are arranged for controlled functional connection of:
  the first ultrasonic transducer to either the generator circuit or the receiver circuit, and
  the second ultrasonic transducer to either the generator circuit or the receiver circuit;
so that the first ultrasonic transducer is electrically connected to the generator circuit and the second ultrasonic transducer is electrically connected to the receiver circuit, or vice versa, and
wherein an output impedance of the generator circuit as seen from the at least two ultrasonic transducers is substantially zero, and wherein an input impedance of the receiver circuit as seen from the at least two ultrasonic transducers is substantially zero.

Thus an ultrasonic flow meter is provided which comprises a separate electronic circuit for generating electrical signals to drive the ultrasonic transducers and a separate electronic circuit for receiving the signal as received by the ultrasonic transducers. By restricting the output impedance of the generator circuit and the input impedance of the receiver circuit to zero, or at least substantially zero, each transducer will always see the same impedance, i.e. zero or substantially zero, irrespectively of whether it operates as transmitter or as receiver. An effect of having an impedance of zero or substantially zero, is that the electronic Q-value of the electronic arrangement may also become very low, which renders the electronic arrangement less sensitive to the electro-mechanical characteristics of the transducers, and in particular to imperfections in, or variations between, the electronic characteristics of the transducers. An impedance of zero or substantially zero should be construed as, that the output impedance of the generator circuit and the input impedance of the receiver circuit is at least very small compared with the electro-mechanical impedance of the transducers, such as below a few percent, e.g. below 2% or below 1%, or even lower such as in the permille range, such as 1 permille, or even lower. Ideally, the impedance is zero ohms.

Since the transducer switching means are arranged for controlled functional connection of, i.e. switching, each ultrasonic transducer to either the generator circuit or to the receiver circuit, so that the first ultrasonic transducer is electrically connected to the generator circuit and the second ultrasonic transducer is electrically connected to the receiver circuit, or vice versa, the setting of the switching means can be made before a measurement without a need for changing the switching state while the ultrasonic signal travels through the medium, and no requirements of a minimum distance to be covered by the ultrasonic wave inside the flow meter is present.

The separate electronic circuits for generating and receiving electrical signals to and from the ultrasonic transducers together with the switch configuration which are set prior to a flow measurement, and the restriction of the output impedance and input impedance to substantially zero thus provides a synergic effect which enables the provision of short highly precise ultrasonic flow meters. Nevertheless, the invention may also advantageously be used in connection with other types of flow meters, since the aspect of render the flow determination less sensitive to the transducer characteristics, and since any restrictions arising from a need to shift the switches while the signal is traversing the medium are removed, are aspects which may also be beneficial in other types of flow meters as well.

In important embodiments, the generator circuit and the receiver circuit are based on operational amplifiers with the non-inverted input connected to a reference source and the inverted input connected to the transducers via the transducer switching means. In such a configuration, the operational amplifiers fix the impedance by which the transducers are loaded, to virtually zero ohms. A setup of this type therefore ensures that the ultrasonic transducers always see the same impedance, i.e. zero or almost zero, irrespective of whether they operate as transmitters or as receivers. An advantage of these embodiments is that impedance matching of individual circuits is not needed during manufacturing to compensate for impedance variations between, in principle identical, electronic components, since such a compensation is not need, as the electrical properties of a properly configured operation amplifier ensures that the inverted input is kept at an impedance of zero ohms.

In advantageous embodiments, additional switches are added to the electronic circuit to further improve the properties of the circuit. By properly placed addition switches, parasitic contributions from the circuit components, and the switches in particular, can be cancelled out in the flow calculation by switching the roles of the two amplifiers in addition to switching between co- and counter propagating ultrasonic waves relative to the flow direction. To this end, the flow calculation can be based on four measurements instead of two measurements, used in some conventional flow meters, such as in the flow meters referred to in the background of the invention. In these flow meters parasitic phase shifts may be introduced e.g. from different switch-on impedances in the two switches applied.

In a second aspect of the invention, there is provided a method of operating an ultrasonic flow meter provided in accordance with embodiments of the first aspects. The method comprises two switch configurations, wherein:

in a first switch configuration, the transducer switching means connects the first ultrasonic transducer to the generator circuit and the second ultrasonic transducer to the receiver circuit;

in a second switch configuration, the transducer switching means connects the second ultrasonic transducer to the generator circuit and the first ultrasonic transducer to the receiver circuit;

and wherein the method comprises the steps:
a) apply a first of the switch configurations;
b) operating the generator circuit to generate a signal for transmission at the connected transducer;
c) without changing the transducer switching means detecting a received signal at the other transducer;
d) deriving a signal feature from the received signal;
e) apply a second of the switch configurations;
f) performing the steps b) to d); and
h) determining the flow rate from the derived signal features obtained at step d).

The method may in embodiments be adapted to include four switches, and wherein, in an embodiment, the method utilizes four switch configurations, wherein:

in the first switch configuration, the transducer switching means connects the first ultrasonic transducer to the generator circuit and the second ultrasonic transducer to the receiver circuit, and the detector switching means connects the detection means to the receiver circuit, and the signal source switching means connects the signal source to the generator circuit;

in the second switch configuration, the transducer switching means connects the second ultrasonic transducer to the generator circuit and the first ultrasonic transducer to the receiver circuit, and the detector switching means connects the detection means to the receiver circuit, and the signal source switching means connects the signal source to the generator circuit;

in a third switch configuration, the transducer switching means connects the first ultrasonic transducer to the generator circuit and the second ultrasonic transducer to the receiver circuit, and the detector switching means connects the detection means to the generator circuit, and the signal source switching means connects the signal source to the receiver circuit;

in a fourth switch configuration, the transducer switching means connects the second ultrasonic transducer to the generator circuit and the first ultrasonic transducer to the receiver circuit, and the detector switching means connects the detection means to the generator circuit, and the signal source switching means connects the signal source to the receiver circuit;

and wherein the method comprises performing the steps a) to h) as defined above, however with step f) changed to:

f) performing the steps b) to d) until all four switch configurations have been applied.

In embodiments, the ultrasonic flow meter may be or may be part of a charging consumption meter, e.g. a water meter, gas meter, heat meter, or cooling meter. The consumption meter may be used in connection with district heating or district cooling. The consumption meter may be a legal meter, i.e. a meter which is subdued to regulatory demands. Such regulatory demands may be demands to the precision of the measurements.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
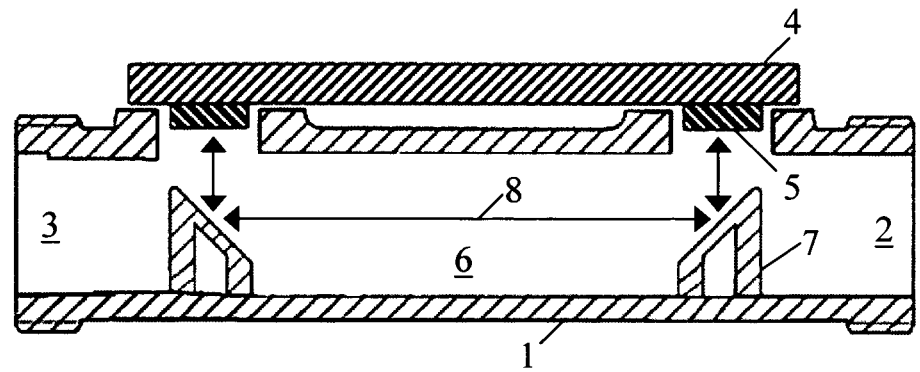
FIG. 1 illustrates a schematic cross-sectional view of an embodiment of an ultrasonic flow meter.

FIG. 1 illustrates a schematic cross-sectional view of an embodiment of an ultrasonic flow meter in the form of a consumption meter. The flow meter comprises a housing 1 with an inlet 2 and outlet 3. The flow meter further comprises an electronic unit 4 comprising or connected to ultrasonic transducers 5. The flow meter comprises a measuring distance 6, here schematically illustrated by a through going channel. The ultrasonic transducers 5 for generating and detecting ultrasonic signals are placed so that the generated signals can be introduced into the measuring distance. Reflectors 7 are placed so that the signals 8 emitted from each of the transducers are directed along the flow passage, and onto the opposite transducer for detection. Signals propagating upstream propagate faster than signals propagating downstream, and the flow rate can be determined by measuring difference in arrival time of the emitted signals at the other transducers. The determination of the flow rate, as well as the outputting of the flow rate is done by the electronic unit 4. The electronic unit at least comprises a measurement circuit operationally connected to the ultrasonic transducers and arranged to determine a value representing the flow rate. The ultrasonic transducers and the measuring circuit may in embodiments be provided as a unit adapted to be mounted onto the housing. Additionally, a consumption meter is normally equipped with a calculator unit which based on the value representing the flow rate is adapted to calculate a consumed quantity, and optionally additional quantities. The calculator unit may be a separate unit or a unit combined with the measuring circuit for operating the transducers. The electronic unit may additionally comprise such elements as a transmitter, e.g. in the form of a radio transmitter, as well as a power supply, e.g. in the form of a battery or a wired connection, as well as other components.

The illustrated ultrasonic flow meter comprises a first transducer positioned at one end of the measuring distance and a second ultrasonic transducer positioned at the other end of the measuring distance. In general, more transducers may be placed at each end. Moreover, three or more reflector units may be used for directing the ultrasonic signals through the measuring distance.

Embodiments of the present invention are directed to ultrasonic flow meters which are based on the time-of-flight principle. In such a flow meter, an estimate of the fluid flow velocity, v, can be obtained from the expression $$v = \frac{L \Delta t}{2 t_0^2} \qquad \text{Eq. (1)}$$

Here L is the physical distance travelled by the pulses, $\Delta t$ is difference in time-of-flight and $t_0$ is the time of flight in the absence of any flow velocity, also referred to as the flow-free time-of-flight (FFTOF). An accurate estimation of the flow velocity requires both $\Delta t$ and $t_0$ to be measured accurately, while L is known.

Figure 2:
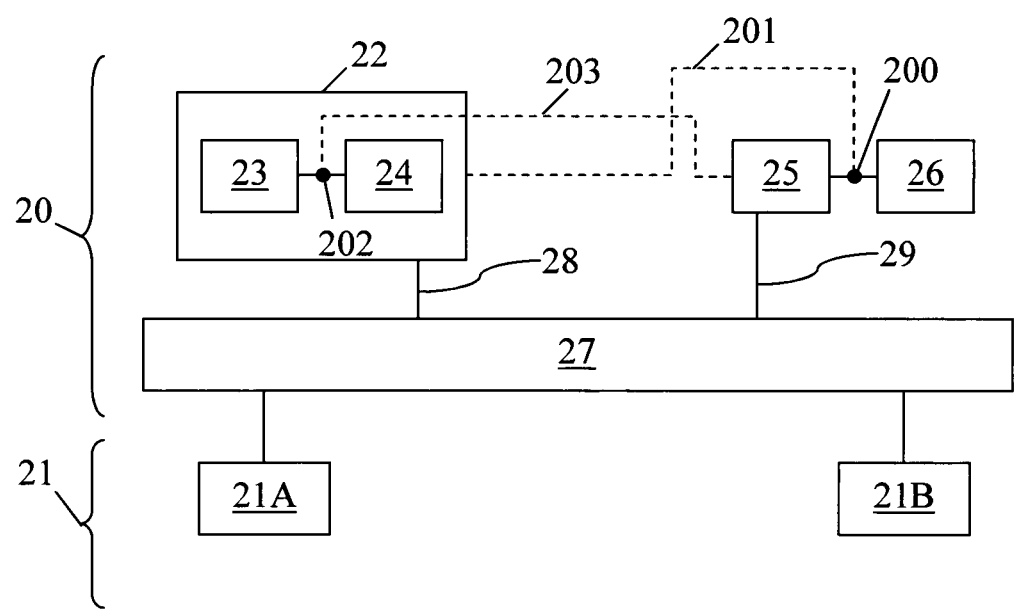
FIG. 2 is a schematic block chart illustrating elements of the electronic circuitry of a flow meter in accordance with embodiments of the invention.

FIG. 2 is a schematic diagram which illustrates general aspects of embodiments of the invention. The figure illustrates a block chart of elements of the electronic circuitry of the ultrasonic flow meter. The figure illustrates elements of the measuring electronics 20 connected to ultrasonic transducers 21, here illustrated as a first 21A and a second 21B transducer.

The measuring electronics comprises a generator circuit 22 for controlled generation of electrical signals for transmission to the ultrasonic transducers. In the illustrated embodiment, the generator circuit comprises a signal source 23 and electronic components 24 for controlling or modifying the signal as output from the signal source.

Further, the measuring electronics comprises a receiver circuit 25 for receiving electrical signals from the at least two ultrasonic transducers, and a detection means 26. The receiver circuit is connected to the detection means. The detection means is, or comprises, a calculation unit for calculating flow related data based on the received signals. The receiver circuit is separated from the generator circuit.

Moreover, the measuring electronics comprises transducer switching means 27, which are arranged for controlled functional connection of the first ultrasonic transducer 21A and the second ultrasonic transducer 21B to either the generator circuit 22 or the receiver circuit 25.

The specific electronic layout of the measuring electronics can be made in any suitable way, as long as the output impedance 28 of the generator circuit and the input impedance 29 of the receiver circuit, as seen from the at least two ultrasonic transducers, are both zero, or at least substantially zero.

In further embodiments, additional components may be present, and in particular further switching means may be present. In an embodiment, a switching means 200 is present which allows switching the input of the detection means 26 between an output of the receiver circuit 25 and an output of the generator circuit 22. To this end, an electrical connection 201 is provided. In another embodiment, an additional switching means 202 is present which allows switching the output of the signal source 23 directly to an input of the receiver circuit 25. To this end, an electrical connection 203 is provided.

Figure 3:
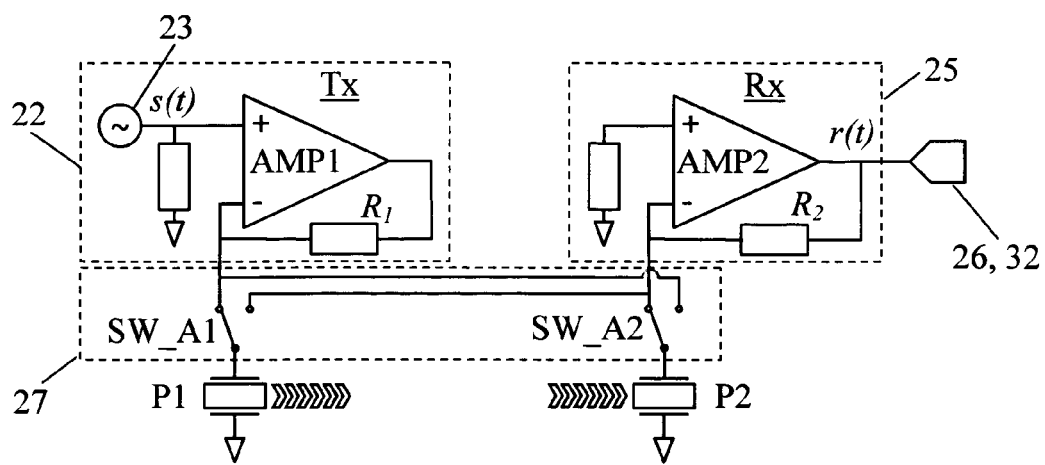
FIG. 3 illustrates an advantageous implementation of the generator circuit, the receiver circuit and the transducer switching means.
Figure 5:
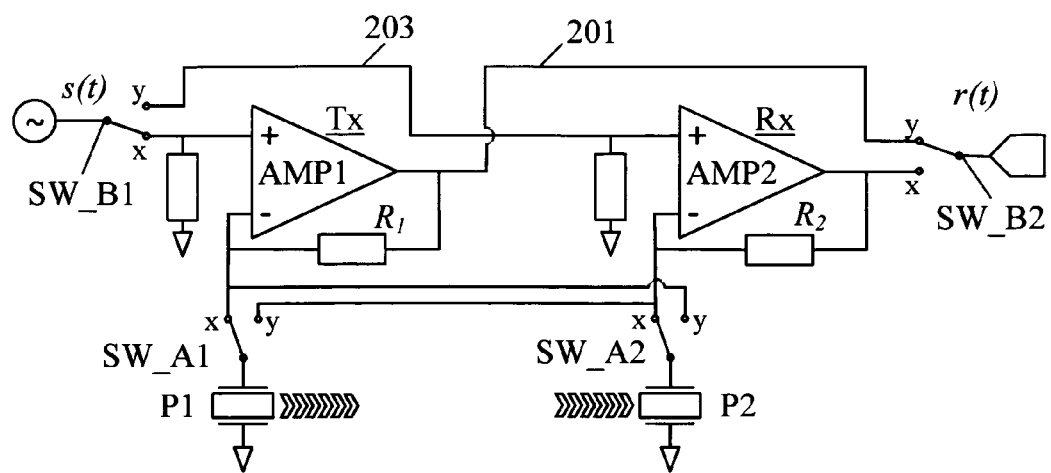
FIG. 5 illustrates an embodiment with a coupling scheme utilizing two additional switches.

Specific embodiments of the generator circuit and receiver circuit are disclosed in connection with FIGS. 3 and 5.

FIG. 3 illustrates an embodiment of an advantageous implementation of the generator circuit 22, the receiver circuit 25 and the transducer switching means 27.

The transducer switching means is implemented by two switches, SW_A1 and SW_A2, which are coupled electrically as illustrated and operated in tandem to electrically connect the first ultrasonic transducer to the generator circuit and the second ultrasonic transducer to the receiver circuit, as shown, or vice versa. These two switch arrangement corresponds to a first switch configuration and a second switch configuration. A signal source 23 generates a drive signal voltage, s(t), which is injected into an amplifier circuit (denoted Tx) and converted into an ultrasonic wave via the piezoelectric transducer, P1. The wave travels through the medium until the receiving transducer, P2, of a construction similar to P1, is reached. By changing the settings of the switches SW_A1 and SW_A2 the direction of the ultrasonic wave relative to the flow direction can be toggled, i.e. by changing from the first to the second switch configuration. The sound pressure wave is converted into an electrical current by the piezoelectricity, and the current is converted into the receiver voltage signal, r(t), by the resistor $R_2$, and finally received at the detection means 26, which comprises an analog to digital converter (ADC) 32 for digitizing the received signal for further treatment. Thus, the generator circuit 22, in addition to the signal source 23, comprises an operational amplifier, AMP1, with a first input connected to the signal source, a second input and an output connected to the second input via a feedback connection. The second input of the generator circuit is moreover operationally connected to the two transducers P1 and P2 via the switches SW_A1 and SW_A2. Similarly, the receiver circuit 25 (also denoted Rx) comprises an operational amplifier, AMP2, with a first input connected to ground (could also be to a given reference potential), a second input and an output connected to the second input via a feedback connection. The second input of the receiver circuit is also operationally connected to the two transducers P1 and P2 via the switches SW_A1 and SW_A2. This implementation fixes the impedance by which the transducers, P1 and P2, are loaded electrically, to virtually zero ohms. As a result the oscillations performed by the transducers will follow the signal, s, closely, and strong damping can be achieved upon ended signal transmission. In this implementation of the generator circuit and the receiver circuit, impedance differences in specific electronic components are automatically compensated for.

Figure 4:
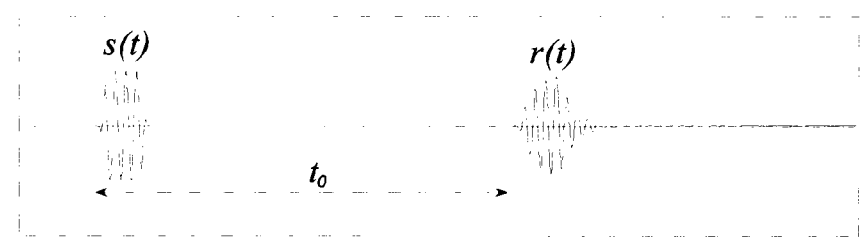
FIG. 4 illustrates an example of a driving signal and a received signal.

FIG. 4 illustrates an example of the driving signal, s(t), and the received signal, r(t). The illustrated signal is a strongly damped signal which is associated with low Q-value transducers. The strong damping is of importance when the FFTOF, $t_0$, is to be determined, since this result in a relatively small outspread of the received signal, which provides better determination of $t_0$.

FIG. 5 illustrates an embodiment with a coupling scheme utilizing two additional switches: SW_B1 and SW_B2. The two additional switches enable toggling between the role of the two circuits Tx and Rx as transmitter or receiver. As a result, 4 combinations of switch settings are encountered which, when the associated signals are combined properly, provide information of the flow velocity and simultaneously cancellation of undesired electronic imperfections from the switches. It is assumed that the components of the circuit behave linearly with respect to the voltage and current. As mentioned, the circuit further comprising a detector switching means, SW_B2 for switching the connection to the detection means between the receiver output (SW_B2 in position x) and the generator output (SW_B2 in position y). Additionally, the circuit further comprises a signal source switching means, SW_B1 for switching the output of the signal source between the generator means (SW_B1 in position x) and an input of the receiver circuit (SW_B1 in position y). Thus four switch configurations are possible.

To further appreciate the role of the four switches, and the four switch configurations, the aforementioned issues are brought on more firm mathematical grounds. The received signals associated with the 4 switch configurations are denoted, $\{r_{xx}(t), r_{yx}(t), r_{xy}(t), r_{yy}(t)\}$, where the first and second subscripts refer to the settings of switch set A and switch set B respectively, in accordance with switches SW_A1 to SW_B2 as illustrated in FIG. 5. The 4 received signals can be expressed in terms of complex spectral transfer functions, and the received signals can be expressed as the following Fourier transforms:

$$r_{xx}(t)=(2\pi)^{-1/2}\int s(\omega)T_{AMP1}(\omega)T_{P1}(\omega)T_{FLOW+}(\omega)R_{P2}(\omega)R_{AMP2}(\omega)e^{i\omega t}d\omega$$

$$r_{yx}(t)=(2\pi)^{-1/2}\int s(\omega)T_{AMP1}(\omega)T_{P2}(\omega)T_{FLOW-}(\omega)R_{P1}(\omega)R_{AMP2}(\omega)e^{i\omega t}d\omega$$

$$r_{xy}(t)=(2\pi)^{-1/2}\int s(\omega)T_{AMP2}(\omega)T_{P2}(\omega)T_{FLOW-}(\omega)R_{P1}(\omega)R_{AMP1}(\omega)e^{i\omega t}d\omega$$

$$r_{yy}(t)=(2\pi)^{-1/2}\int s(\omega)T_{AMP2}(\omega)T_{P1}(\omega)T_{FLOW+}(\omega)R_{P2}(\omega)R_{AMP1}(\omega)e^{i\omega t}d\omega \quad \text{Eq. (2)}$$

All circuit components are assumed to be linear. The functions $T_{AMPk}(\omega)$ and $T_{Pk}(\omega)$, $k=\{1,2\}$, are spectral transfer functions for the amplifiers and piezo electric transducers on the transmission side of the flow meter, whereas the functions $R_{AMPk}(\omega)$ and $R_{Pk}(\omega)$, $k=\{1,2\}$, are spectral transfer functions for the amplifiers and piezo electric transducers on the receiver side of the flow meter; and the functions $T_{FLOW\pm}(\omega)=\exp[-\alpha-i(\omega t_0\gamma\phi/2)]$ are the spectral transfer functions associated with the transmission of the ultrasonic wave through the fluid medium co- and counter propagating with the flow respectively. The phase shift, $\phi=\omega\Delta t$, forms the basis of the flow velocity calculation and the attenuation of the ultrasonic transmission through the flow meter is described by the (real) parameter $\alpha$. Embedded in the amplifier transfer functions are the transfer characteristics of the switch set B, which may not be the same in the two positions of the individual switches. Since the same applies for switch set A, the characteristics of these components is incorporated in the spectral response functions for the transducers and the reciprocity of the circuit is exploited (in the absence of flow), to write $T_{P1}R_{P2}=T_{P2}R_{P1}=\exp[-\beta_x-i\psi_x]$ when the switches of switch set A are in the 'x' position and $T_{P1}R_{P2}=T_{P2}R_{P1}=\exp[-\beta_y-i\psi_y]$ when position 'y' is chosen. The functions $T_{AMPk}(\omega)$ and $R_{AMPk}(\omega)$ are parameterized similarly, depending on the position of the switches of switch set B: $T_{AMP1}R_{AMP2}=\exp[-\gamma_x-i\theta_x]$ and $T_{AMP2}R_{AMP1}=\exp[-\gamma_y-i\theta_y]$.

Summing up all of the above, the following expressions for the received signals results:

$$r_{xx}(t)=(2\pi)^{-1/2}\int s(\omega)\exp[-(\alpha+\beta_x+\gamma_x)-i(\omega t_0+\psi_x+\theta_x-\phi/2)]e^{i\omega t}d\omega$$

$$r_{yx}(t)=(2\pi)^{-1/2}\int s(\omega)\exp[-(\alpha+\beta_y+\gamma_x)-i(\omega t_0+\psi_y+\theta_x-\phi/2)]e^{i\omega t}d\omega$$

$$r_{xy}(t)=(2\pi)^{-1/2}\int s(\omega)\exp[-(\alpha+\beta_x+\gamma_y)-i(\omega t_0+\psi_x+\theta_y-\phi/2)]e^{i\omega t}d\omega$$

$$r_{yy}(t)=(2\pi)^{-1/2}\int s(\omega)\exp[-(\alpha+\beta_y+\gamma_y)-i(\omega t_0+\psi_y+\theta_y-\phi/2)]e^{i\omega t}d\omega \quad \text{Eq. (3)}$$

The parameters $\alpha$, $\beta_{x/y}$, $\gamma_{x/y}$, $\theta_{x/y}$, $\psi_{x/y}$ and $\phi$ are all functions of the frequency, $\omega$, but subsequent filtering around a center frequency, $\omega_0$, followed by phase detection will reveal the four overall phase delays picked up by signal during passage of the circuit:

$$\Phi_{xx} = \omega_0 t_0 + \psi_x + \theta_x - \phi/2$$

$$\Phi_{yx} = \omega_0 t_0 + \psi_y + \theta_x + \phi/2$$

$$\Phi_{xy} = \omega_0 t_0 + \psi_x + \theta_y + \phi/2$$

$$\Phi_{yy} = \omega_0 t_0 + \psi_y + \theta_y - \phi/2, \qquad \text{Eq. (4)}$$

and the flow velocity can be accessed by forming $$v = \frac{L\Delta t}{2t_0^2} = \frac{L(\Phi_{yx} - \Phi_{xx} + \Phi_{xy} - \Phi_{yy})}{4\omega_0 t_0^2}. \qquad \text{Eq. (5)}$$

By combining Eq. (4) and Eq. (5) it is seen that the parasitic phase shifts, $\psi_x, \psi_y, \theta_x, \theta_y$, are cancelled out, and only the flow related phase delays, $\phi$, persist.

It is noted that the FFTOF, $t_0$, is yet to be determined. This quantity can be determined in a number of ways. In a simple implementation, it can be utilized that it is a function mainly of temperature of the fluid medium, and a simple measurement of temperature and use of a look-up table could be used to infer the value of $t_0$. In another embodiment, digital signal treatment can be used to deriving a signal feature from the received signal which can be compared to a template signal, to determine the time of arrival of the signal feature. U.S. Pat. No. 6,305,233 B1 discloses a method for deriving the transmission time, based on a comparison with a template signal.

Embodiments of the present invention render it possible to accurately determine the envelope shape of received signals, so that the FFTOF can be accurately determined regardless of variations in the envelope shape when e.g. the temperature changes or ageing occurs. The envelope shape can then be used as adaptive template signal for accurate comparison with the received signal.

In the embodiment of FIG. 5, the depicted switch coupling can be used to infer the shape of the signal envelope independent of the flow measurement. The switch SW_B1 is set in 'x' position while SW_B2 is set in 'y' position. With the switch SW_A1 in 'x' position will result in the recorded signal given by $$r_{P1}(t) = (2\pi)^{-1/2} \int s(\omega)\left[1 + \frac{R_1}{Z_{P1}(\omega)}\right]e^{i\omega t}d\omega, \qquad \text{Eq. (6)}$$

where $Z_{P1}(\omega)$ is the electrical impedance of the transducer P1. Since the injected signal $s(\omega)$ is known, we can invert the above expression to recover $Z_{P1}(\omega)$:

$$Z_{P1}(\omega) = R_1 \frac{s(\omega)}{r_{P1}(\omega) - s(\omega)}, \qquad \text{Eq. (7)}$$

where $r_{P1}(\omega) = (2\pi)^{-1/2}\int r_{P1}(t)\exp(-i\omega t)dt$. $Z_{P1}$ is an important quantity, since it essentially describes the envelope shape together with the P2 equivalent, $Z_{P2}(\omega) = R_2 s/(r_{P2}-s)$. The latter can be inferred by switching SW_B1 and SW_B2 while SW_A2 is in the 'x'. Given that the transducers have low mechanical Q-values, and since they are loaded electrically with small impedance, we can interpret $Z_{P1}(\omega)$ and $Z_{P2}(\omega)$ as being proportional with the spectral transfer functions for their respective transducers. Assuming ideal amplifiers with sufficient bandwidth and ignoring the, for this purpose, irrelevantly small delays introduced by the switches, we set $T_{AMP1}R_{AMP2} = T_{AMP2}R_{AMP1} = g$, where g is a constant. Similarly, we set $T_{P1}/R_{P2} = T_{P2}R_{P1} = h Z_{P1}(\omega)Z_{P2}(\omega)$, where h is a constant. This is now introduced in the Fourier transforms above to provide the following two expressions for the received signals of the flow measurement:

$$r_+(t) = (2\pi)^{-1/2}gh\int s(\omega)Z_{P1}(\omega)T_{FLOW+}(\omega)Z_{P2}(\omega)e^{i\omega t}d\omega$$

$$r_-(t) = (2\pi)^{-1/2}gh\int s(\omega)Z_{P1}(\omega)T_{FLOW-}(\omega)Z_{P2}(\omega)e^{i\omega t}d\omega, \qquad \text{Eq. (8)}$$

where $r_+$ corresponds to co-propagating flow and sound, while $r_-$ is the counter propagating case. By inverting the above equations we can solve for $T_{FLOW\pm}$ to find:

$$T_{FLOW\pm}(\omega) = \frac{r_\pm(\omega)}{ghZ_{P1}(\omega)Z_{P2}(\omega)s(\omega)} = \exp[-\alpha - i(\omega t_0 \mp \varphi/2)], \qquad \text{Eq. (9)}$$

from which we obtain $t_0$ as:

$$t_0 = -\frac{1}{2\omega}\arctan\left[\frac{\text{Im}\{T_{FLOW+}(\omega)T_{FLOW-}(\omega)\}}{\text{Re}\{R_{FLOW+}(\omega)T_{FLOW-}(\omega)\}}\right]. \qquad \text{Eq. (10)}$$

In practice the constants g and h are irrelevant, since we are seeking only the argument of $T_{FLOW+} T_{FLOW-}$.

As mentioned earlier, this determination of the FFTOF has the advantage of being very robust against variations in physical parameters such as transducer resonance frequency, Q-values, acoustical and electrical impedances etc. As a result relatively wide tolerances can be maintained in production of the flow meter.

This determination of FFTOF is advantageous in itself. A flow meter which only comprises the detector switching means, SW_B2, and electrical connection 201, and not the signal switching means SW_B1 and the electrical connection 203, may benefit from an improved FFTOF determination as disclosed above. The impedances $Z_{P1}$ and $Z_{P2}$ can be inferred by setting SW_B2 to the y-position, and toggle the switches SW_A1 and SW_A2.

Generally, an ultrasonic flow meter in accordance with embodiments of the present invention is operated by controlling the transducer switching means to determine the signal direction. This is done by setting the switches SW_A1 and SW_A2 in appropriate positions, so that one ultrasonic transducer (or group of transducers) is connected to the generator circuit and the other ultrasonic transducer (or group of transducers) is connected to the receiver circuit. With the desired signal direction, the generator circuit is operated to generate a signal which is transmitted by the first transducer and detected as a received signal at the second transducer. In an embodiment, the received signal is digitized in order to derive a signal feature from the received signal. The derived signal feature is compared to a corresponding feature of a template signal in order to determine an arrival time of the signal at the second transducer.

This operation scheme may be expanded by adding steps to operate the switching of the signal source switching means and/or the detector switching means in order to operate a flow meter as disclosed in connection with FIG. 5.

FIGS. 3 and 5 comprises a number of resistors. The specific choice of these resistors, as well as the presence of equivalent

The invention claimed is:

1. An ultrasonic flow meter arranged to measure a flow rate of a fluid, wherein the ultrasonic flow meter comprises:
   at least two ultrasonic transducers arranged for transmission and receipt of ultrasonic signals in opposite directions across a measuring distance, wherein the at least two ultrasonic transducers comprise at least a first transducer positioned at one end of the measuring distance and at least a second ultrasonic transducer positioned at the other end of the measuring distance;
   a transducer switch electrically connected to the at least two ultrasonic transducers;
   a generator circuit for controlled generation of electrical signals for transmission to the at least two ultrasonic transducers, wherein the generator circuit comprises or is connected to a signal source;
   a receiver circuit for receiving electrical signals from the at least two ultrasonic transducers, the receiver circuit being separate from the generator circuit, wherein the receiver circuit comprises a receiver output for connection to a detector;
   wherein the transducer switch is arranged for controlled functional connection of:
   the first ultrasonic transducer to either the generator circuit or the receiver circuit, and
   the second ultrasonic transducer to either the generator circuit or the receiver circuit;
   so that the first ultrasonic transducer is electrically connected to the generator circuit and the second ultrasonic transducer is electrically connected to the receiver circuit, or vice versa, wherein an output impedance of the generator circuit as seen from the at least two ultrasonic transducers is substantially zero, and wherein an input impedance of the receiver circuit as seen from the at least two ultrasonic transducers is substantially zero,
   wherein the generator circuit comprises an operational amplifier with a first input connected to the signal source, a second input and an output connected to the second input via a feedback connection, and wherein the second input is further connected to the transducer switch so that the second input is operationally connected to the at least two transducers via the switch, and
   wherein the receiver circuit comprises an operational amplifier with a third input connected to ground or to a reference potential, a fourth input and a second output connected to the fourth input via a feedback connection, and wherein the fourth input is further connected to the transducer switch so that the fourth input is operationally connected to the at least two transducers via the switch.

2. The ultrasonic flow meter according to claim 1, wherein the detector comprises an analogue-to-digital converter (ADC) for digitizing the received signal.

3. The ultrasonic flow meter according to claim 1, further comprising a detector switch for switching the connection to the detector between the output of the operational amplifier of the receiver circuit and the second output of the operational amplifier of the generator circuit.

4. The ultrasonic flow meter according to claim 3, further comprising a signal source switch for switching the output of the signal source between the generator and an input of the receiver circuit.

5. The ultrasonic flow meter according to claim 1, wherein the impedance by which the at least two ultrasonic transducers are loaded is fixed to virtual zero ohms.

6. A method of operating the ultrasonic flow meter set forth in claim 1, wherein:
   in a first switch configuration, the transducer switch connects the first ultrasonic transducer to the generator circuit and the second ultrasonic transducer to the receiver circuit;
   in a second switch configuration, the transducer switch connects the second ultrasonic transducer to the generator circuit and the first ultrasonic transducer to the receiver circuit;
   and wherein the method comprises:
   a) applying a first switch configuration;
   b) operating the generator circuit to generate a signal for transmission at the connected transducer;
   c) detecting a received signal at the other transducer without changing the transducer switch;
   d) deriving a signal feature from the received signal;
   e) applying a second switch configuration;
   f) performing steps b) to d); and
   h) determining the flow rate from the derived signal features obtained at step d).

7. The method of operating the ultrasonic flow meter according to claim 6, wherein:
   in the first switch configuration, the transducer switch connects the first ultrasonic transducer to the generator circuit and the second ultrasonic transducer to the receiver circuit, and the detector switch connects the detector to the receiver circuit, and the signal source switch connects the signal source to the generator circuit;
   in the second switch configuration, the transducer switch connects the second ultrasonic transducer to the generator circuit and the first ultrasonic transducer to the receiver circuit, and the detector switch connects the detector to the receiver circuit, and the signal source switch connects the signal source to the generator circuit;
   in a third switch configuration, the transducer switch connects the first ultrasonic transducer to the generator circuit and the second ultrasonic transducer to the receiver circuit, and the detector switch connects the detector to the generator circuit, and the signal source switch connects the signal source to the receiver circuit.

* * * * *

UNITED STATES PATENT AND TRADEMARK OFFICE
CERTIFICATE OF CORRECTION

PATENT NO.       : 9,080,906 B2
APPLICATION NO.  : 13/880932
DATED            : July 14, 2015
INVENTOR(S)      : Sorensen et al.

Page 1 of 1

It is certified that error appears in the above-identified patent and that said Letters Patent is hereby corrected as shown below:

In the Specification

In column 9, at line 61, change "$r_{P1}(\omega) = (2\pi)^{-1/2} \int r_{P1}(t) \exp(-i\omega t) dt$" to --$r_{P1}(\omega) = (2\pi)^{-1/2} \int r_{P1}(t) \exp(-i\omega t) dt$--

In column 10, at lines 26-28, change "$t_0 = -\dfrac{1}{2\omega} \arctan\left[\dfrac{\text{Im}\{T_{FLOW+}(\omega) T_{FLOW-}(\omega)\}}{\text{Re}\{R_{FLOW+}(\omega) T_{FLOW-}(\omega)\}}\right]$" to --$t_0 = -\dfrac{1}{2\omega} \arctan\left[\dfrac{\text{Im}\{T_{FLOW+}(\omega) T_{FLOW-}(\omega)\}}{\text{Re}\{T_{FLOW+}(\omega) T_{FLOW-}(\omega)\}}\right]$--

Signed and Sealed this
Fifth Day of April, 2016

Michelle K. Lee
*Director of the United States Patent and Trademark Office*